United States Patent
Mola

(10) Patent No.: US 11,960,406 B2
(45) Date of Patent: Apr. 16, 2024

(54) OMITTING PROCESSOR-BASED LOGGING OF SEPARATELY OBTAINABLE MEMORY VALUES DURING PROGRAM TRACING

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/921,053

(22) PCT Filed: May 4, 2021

(86) PCT No.: PCT/US2021/030552
§ 371 (c)(1),
(2) Date: Oct. 24, 2022

(87) PCT Pub. No.: WO2021/226012
PCT Pub. Date: Nov. 11, 2021

(65) Prior Publication Data
US 2023/0169010 A1   Jun. 1, 2023

(30) Foreign Application Priority Data
May 5, 2020   (LU) .................................. LU101769

(51) Int. Cl.
*G06F 12/00*   (2006.01)
*G06F 12/0888*   (2016.01)
(Continued)

(52) U.S. Cl.
CPC ...... *G06F 12/0888* (2013.01); *G06F 12/1009* (2013.01); *G06F 12/1027* (2013.01); *G06F 2212/452* (2013.01)

(58) Field of Classification Search
CPC ............ G06F 12/0888; G06F 12/1009; G06F 12/1027; G06F 2212/452; G06F 11/1446; G06F 11/1471
See application file for complete search history.

(56) References Cited

U.S. PATENT DOCUMENTS 9,934,127 B1   4/2018   Mola et al.
2018/0060215 A1   3/2018   Mola
(Continued)

OTHER PUBLICATIONS

U.S. Appl. No. 17/921,053, filed May 4, 2021.
(Continued)

*Primary Examiner* — Shawn X Gu
(74) *Attorney, Agent, or Firm* — Workman Nydegger

(57) ABSTRACT

Reducing overheads of recording a replayable execution trace of a program's execution at a computer processor by omitting logging of accesses to memory addresses whose values can be reconstructed or predicted. A computer system determines that memory values corresponding to a range of memory addresses within a memory space for a process can be obtained separately from the process' execution, and configures a data structure for instructing a processor to omit logging of memory accesses when the processor accesses an address within this range while executing the process. Correspondingly, upon detecting a memory access while executing the process, the processor determines if it has been instructed to omit logging of the access by checking the data structure. When the data structure instructs the processor to omit logging of the access, the processor omits logging the memory access while it uses a cache to process the memory access.

20 Claims, 6 Drawing Sheets

(51) Int. Cl.
*G06F 12/1009* (2016.01)
*G06F 12/1027* (2016.01)

(56) References Cited

U.S. PATENT DOCUMENTS

| | | | |
|---|---|---|---|
| 2018/0113806 A1* | 4/2018 | Mola | G06F 12/084 |
| 2018/0113809 A1* | 4/2018 | Mola | G06F 12/0864 |
| 2019/0087305 A1 | 3/2019 | Mola | |
| 2019/0286549 A1 | 9/2019 | Mola | |
| 2023/0176971 A1 | 6/2023 | Mola | |

OTHER PUBLICATIONS

U.S. Appl. No. 17/921,048, filed Apr. 30, 2021.
U.S. Appl. No. 17/921,067, filed Apr. 30, 2021.
"Search Report and Written Opinion Issued in Luxembourg Patent Application No. LU101767", dated Feb. 26, 2021, 13 Pages.
"Search Report and Written Opinion Issued in Luxembourg Patent Application No. LU101768", dated Feb. 10, 2021, 11 Pages.
"Search Report and Written Opinion Issued in Luxembourg Patent Application No. LU101769", dated Feb. 5, 2021, 12 Pages.
"International Search Report & Written Opinion Issued in PCT Application No. PCT/US21/030199", dated Aug. 27, 2021, 15 Pages.
"International Search Report & Written Opinion Issued in PCT Application No. PCT/US21/030220", dated Aug. 25, 2021, 16 Pages.
"International Search Report & Written Opinion Issued in PCT Application No. PCT/US21/030552", dated Feb. 24, 2022, 20 Pages.
U.S. Appl. No. 17/921,063, filed Apr. 30, 2021.

* cited by examiner

OMITTING PROCESSOR-BASED LOGGING OF SEPARATELY OBTAINABLE MEMORY VALUES DURING PROGRAM TRACING

CROSS-REFERENCE TO RELATED APPLICATIONS

The present application is a U.S. National Stage of International Application No. PCT/US2021/030552, filed on May 4, 2021, designating the United States and claiming the priority of Luxembourg Patent Application No. LU101769 filed with the Luxembourg Intellectual Property Office on May 5, 2020. All of the aforementioned applications are incorporated herein in their respective entireties by this reference.

TECHNICAL FIELD

The present disclosure relates to systems, methods, and devices for reducing the computing overheads associated with recording a replayable execution trace of a computer program.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors can be triggered by a vast variety of factors such as data inputs, user inputs, race conditions (e.g., when accessing shared resources), etc. Given the variety of triggers, undesired software behaviors can be rare and seemingly random, and extremely difficult reproduce. As such, it can be very time-consuming and difficult for a developer to identify a given undesired software behavior. Once an undesired software behavior has been identified, it can again be time-consuming and difficult to determine its root cause(s).

Developers have conventionally used a variety of approaches to identify undesired software behaviors, and to then identify the location(s) in an application's code that cause the undesired software behavior. For example, developers often test different portions of an application's code against different inputs (e.g., unit testing). As another example, developers often reason about execution of an application's code in a debugger (e.g., by setting breakpoints/watchpoints, by stepping through lines of code, etc. as the code executes). As another example, developers often observe code execution behaviors (e.g., timing, coverage) in a profiler. As another example, developers often insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of a program's thread(s) is recorded into one or more trace files (i.e., an execution trace). Using some tracing techniques, an execution trace can contain "bit-accurate" historic execution trace data, which enables the recorded portion(s) the traced thread(s) to be virtually "replayed" (e.g., via emulation) down to the granularity of individual instructions (e.g., machine code instructions, intermediate language code instructions, etc.). Thus, using "bit-accurate" trace data, diagnostic tools can enable developers to reason about a recorded prior execution of subject code, as opposed to a "live" forward execution of that code. For example, using replayable execution traces, some historic debuggers provide user experiences that enable both forward and reverse breakpoints/watchpoints, that enable code to be stepped through both forwards and backwards, etc. Some historic profilers, on the other hand, are able to derive code execution behaviors (e.g., timing, coverage) from prior-executed code.

Since modern microprocessors commonly execute at the rate of tens- to hundreds- of thousands of MIPS (millions of instructions per second), replayable execution traces of a program's thread can capture vast amounts of information, even if mere fractions of a second of the thread's execution are captured. As such, these replayable execution traces can quickly grow very large in size in memory and/or on disk. In addition, the act of identifying and recording trace data of a program's thread inherently consumes processor resources, thereby reducing the amount of processor resources that are available to the thread while it is being traced and impacting the thread's execution performance.

BRIEF SUMMARY

When tracing a program's execution at a computer processor, at least some embodiments described herein reduce at least one of (i) the size of a replayable execution trace of the program, or (ii) the processor overheads associated with recording the replayable execution trace of the program. In particular, some embodiments identify memory addresses within a process' memory space whose values can be reconstructed or predicted separately from memory accesses by instructions that execute as part of the process, and instruct a processor to omit logging of accesses to these memory addresses when the processor is tracing execution of the process. Correspondingly, some embodiments configure a processor to make logging decisions during tracing of a process based on accessing an identification of memory addresses for which the processor has been instructed to omit logging. By omitting logging of some memory accesses, the embodiments herein reduce the amount of data recorded into execution traces, and reduce tracing workload on a processor.

Embodiments are directed to methods, systems, and computer program products for instructing a processor to omit logging of memory addresses whose values can be reconstructed or predicted. In these embodiments, based at least on configuring a memory space for a process, a computer system determines that memory values corresponding to a particular range of memory addresses within the memory space for the process can be reconstructed or predicted separately from logging memory accesses by instructions that execute as part of the process. Based at least on the determination, the computer system configures one or more data structures that instruct the processor to omit logging memory accesses into a trace of the process when the processor accesses a memory address within the particular range of memory addresses during execution of the process at the processor, and stores one or more indicia of how to reconstruct or predict the memory values corresponding to the particular range of memory addresses.

Embodiments are also directed to methods, systems, and computer program products for making a logging decision based on accessing an identification of memory addresses for which the processor is instructed to omit logging. In these embodiments, a processor that includes one or more processing units and a cache also includes control logic that configures the processor to, during execution of a thread corresponding to a process that executes at the one or more processing units, detect a memory access by an executable instruction that executes as part of the thread. The memory access is targeted at a particular memory address within a memory space for the process. The control logic also configures the processor to, based at least on detecting the memory access, determine if the processor has been instructed to omit logging of accesses to the particular memory address into a trace corresponding to the process. The determining includes checking one or more data structures that identify at least one range of memory addresses within the memory space for the process, accesses to which the processor is instructed to omit logging during execution of the process at the one or more processing units. The control logic also configures the processor to, in response to determining if the processor has been instructed to omit logging of accesses to the particular memory address, either (i) use the cache to process the memory access without logging the memory access based at least on having determined that the processor has been instructed to omit logging of accesses to the particular memory address, or (ii) use the cache to process the memory access while also logging the memory access into the trace based at least on it being determined that the processor has not been instructed to omit logging of accesses to the particular memory address.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein reduce at least one of the size of a replayable execution trace of the program, or the processor overheads associated with recording a replayable execution trace of the program, based at least on identifying memory addresses whose values can be reconstructed or predicted separately from logging memory accesses by instructions that execute as part of a process, and on instructing a processor to omit logging of accesses to those memory addresses during execution of the process; a processor, in turn, makes logging decisions during tracing of the process based on accessing an identification of the memory addresses for which the processor has been instructed to omit logging.

Figure 1A:
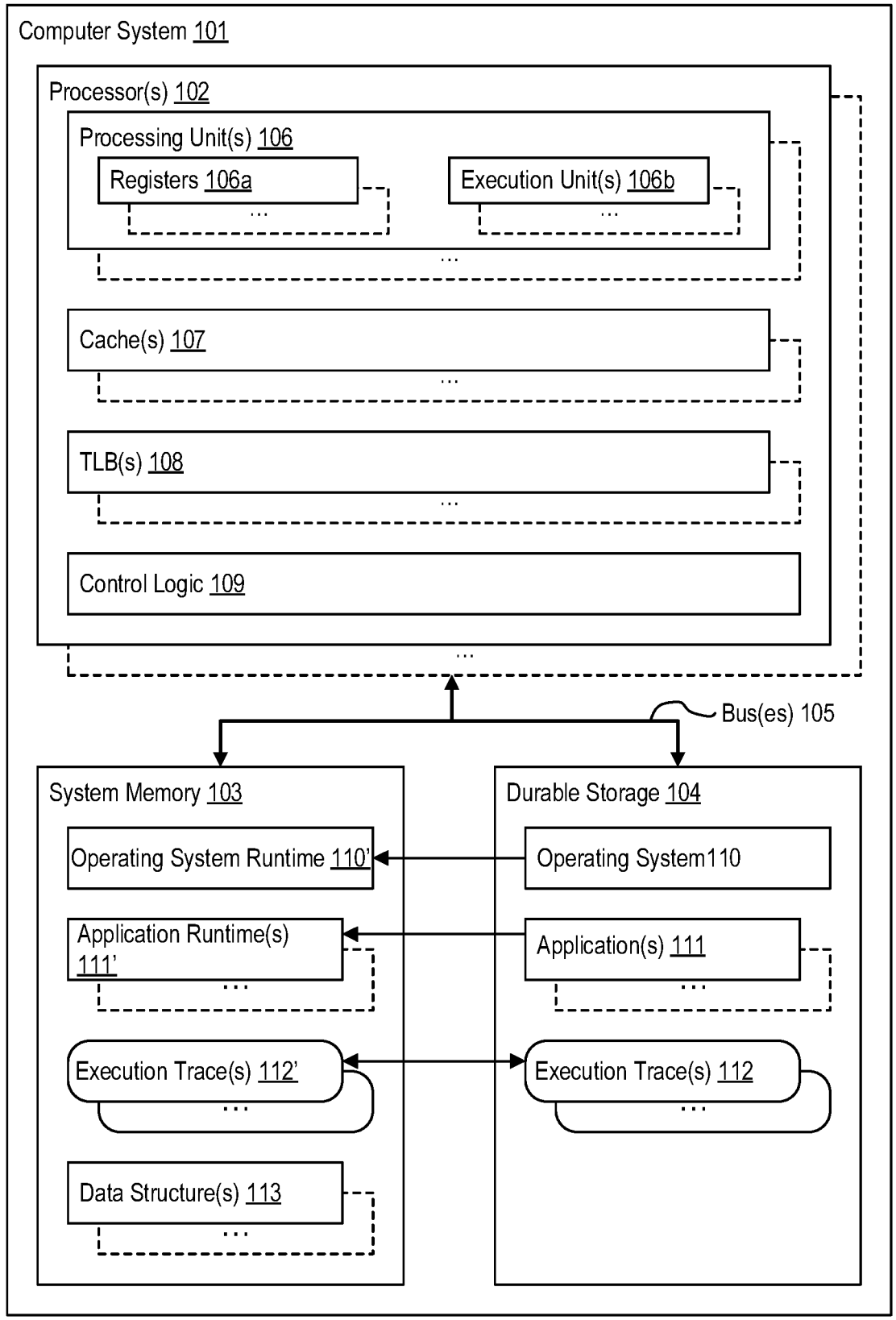
FIG. 1A illustrates an example computing environment that facilitates omitting of logging of accesses to memory addresses within a process' memory space, by a processor that is tracing the process, when those values can be reconstructed or predicted separately from logging memory accesses by instructions that execute as part of the process.

To the accomplishment of these, and other, embodiments, FIG. 1A illustrates an example computing environment 100 that facilitates omitting of logging of accesses to memory addresses within a process' memory space, by a processor that is tracing the process, when those values can be reconstructed or predicted separately from logging memory accesses by instructions that execute as part of the process. In particular, computing environment 100 includes a special-purpose or general-purpose computer system 101 that is configured to instruct a processor to omit logging of accesses to memory addresses whose values can be reconstructed or predicted. Correspondingly, computer system 101 includes one or more processors 102 that are configured to make logging decisions, during tracing of a process, based on accessing an identification of memory addresses for which the processor(s) 102 have been instructed to omit logging. As shown, computer system 101 also includes at least system memory 103 and durable storage 104, which are communicatively coupled to each other, and to the processor(s) 102, using one or more communications buses 105.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (not shown), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, in embodiments each processor 102 includes one or more processing unit(s) 106, one or more cache(s) 107, one or more translation lookaside buffer(s) (TLBs) 108, and control logic 109. In general, each processing unit 106 (e.g., processor core) loads and executes machine code instructions at execution units 106b. During execution of these machine code instructions, the instructions can use internal processor registers 106a as temporary storage locations, and can read and write to various locations in system memory 103 via the cache(s) 107. Each processing unit 106 in a given processor 102 executes machine code instructions that are selected from among a predefined processor instruction set architecture (ISA) of the processor 102. The particular ISA of each processor 102 can vary based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, a machine code instruction is the smallest externally-visible (i.e., external to the processor) unit of code that is executable by a processor.

Registers 106a are hardware-based storage locations that are defined based on the ISA of the processor 102. In general, registers 106a are read from and/or written to by machine code instructions, or a processing unit 106, as those instructions execute at an execution unit 106b. Registers 106a are commonly used to store values fetched from the cache(s) 107 for use as inputs to executing machine code instructions, to store the results of executing machine code instructions, to store a program instruction count, to support maintenance of a thread stack, etc. In some embodiments, registers 106a can include "flags" that are used to signal some state change caused by executing machine code instructions (e.g., to indicate if an arithmetic operation cased a carry, a zero result, etc.). In some embodiments, registers 106a include one or more control registers (e.g., which are used to control different aspects of processor operation), and/or other processor model-specific registers (MSRs).

The cache(s) 107 temporarily cache portions of system memory 103 during execution of machine code instructions by the processing unit(s) 106. In some embodiments, cache(s) 107 include one or more "code" portions that cache portions of system memory 103 storing application code, as well as one or more "data" portions that cache portions of system memory 103 storing application runtime data. If a processing unit 106 requires data (e.g., code or application runtime data) not already stored in the cache(s) 107, then the processing unit 106 initiates a "cache miss," causing the needed data to be fetched from system memory 103 and into the cache(s) 107—while potentially replacing and "evicting" some other data already stored in the cache(s) 107 back to system memory 103. In some embodiments, the cache(s) 107 are divided into separate tiers, layers, or levels—such as layer 1(L1), layer 2 (L2), layer 3 (L3), etc. Depending on processor implementation, one of these tiers could be part of the processor 102, itself (e.g., L1 and L2), and/or could be separate from the processor 102 (e.g., L3). Thus, in some embodiments, the cache(s) 107 comprise one of these layers (L1), while in other embodiments the cache(s) 107 comprise a plurality of these layers (e.g., L1 and L2, and even L3). In some embodiments at least one layer of the cache(s) 107 may be part of the processing unit(s) 106.

Figure 2A:
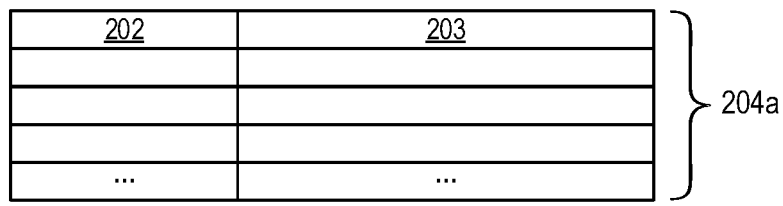
FIG. 2A illustrates an example processor cache.

In embodiments, each layer of cache(s) 107 comprises a plurality of "cache lines," each of which stores a chunk of memory from a backing store (e.g., system memory 103, or a higher-layer cache). For example, FIG. 2A illustrates an example of a processor cache 200a that includes a plurality of cache lines 204a. In the example, each cache line 204a comprises at least an address portion 202 and a value portion 203. In embodiments, the address portion 202 of each cache line 204a is configured to store at least a memory address within system memory 103 to which the cache line corresponds, and the value portion 203 initially stores a data value obtained starting at that address in system memory 103. Depending on a size of the value portion 203, each cache line 204a could store data spanning a plurality of consecutive individually-addressable locations in system memory 103. The value portion 203 of each cache line 204a can be modified by processing units 106, and eventually be evicted back to system memory 103. As indicated by the ellipses within cache 200a, the cache(s) 107 can include a large number of cache lines. For example, a contemporary 64-bit INTEL processor may contain individual L1 caches comprising 512 or more cache lines. In such a cache, each cache line is typically usable to store a 64-byte (512-bit) value in reference to a 6-byte (48-bit) to 8-byte (64-bit) memory address.

In some situations, an address portion of a cache line of the cache(s) 107 stores a physical memory address, such as the actual corresponding memory address in system memory 103. In other situations, an address portion of a cache line of the cache(s) 107 stores a virtual memory address. In embodiments, a virtual memory address is an address within a virtual address space that is exposed by an operating system to a process executing at processor(s) 102. This virtual address space provides one or more abstractions to the process, such as that the process has its own exclusive memory space and/or that the process has more memory available to it than actually exists within system memory 103. Such abstractions can be used, for example, to facilitate memory isolation between different processes executing at the processor(s) 102, including isolation between user-mode processes and kernel mode processes. In embodiments, virtual to physical memory address mappings are maintained within memory page tables that are stored in system memory 103, and that are managed by an operating system (e.g., operating system 110). In general, these memory page tables comprise a plurality of page table entries (PTEs) that map ranges (i.e., pages) of virtual memory addresses to ranges (i.e., pages) of physical memory addresses. In embodiment each PTE stores additional attributes, or flags, about its corresponding memory pages, such as memory page permissions (e.g., read-only, writeable, etc.), page state (e.g., dirty, clean, etc.), and the like. In embodiments, the TLB(s) 108 within each processor 102 facilitate virtual addressing, and comprises a special form of cache that stores recently obtained PTEs mapping virtual and physical memory pages, as obtained from the memory page tables stored in system memory 103.

In embodiments, control logic 109 of each processor 102 comprises microcode (i.e., executable instructions) and/or gate logic that controls operation of the processor 102. In general, control logic 109 functions as an interpreter between the hardware of the processor 102 and the processor ISA exposed by the processor 102 to executing applications (e.g., operating system 110 and application(s) 111). In embodiments, the control logic 109 is embodied on on-processor storage, such as ROM, EEPROM, etc. In some embodiments, this on-processor storage is writable (in which case the control logic 109 is updatable), while in other embodiments this on-processor storage is read-only (in which case the control logic 109 cannot be updated).

The durable storage 104 stores computer-executable instructions and/or data structures representing executable software components. Correspondingly, during execution of these software components at the processor(s) 102, one or more portions of these computer-executable instructions and/or data structures are loaded into system memory 103. For example, the durable storage 104 is illustrated as storing computer-executable instructions and/or data structures corresponding to an operating system 110 and one or more application(s) 111. Correspondingly, the system memory 103 is shown as storing an operating system runtime 110' (e.g., machine code instructions and/or runtime data supporting execution of operating system 110), and as storing one or more application runtime(s) 111' (e.g., machine code instructions and/or runtime data supporting execution of one or more of application(s) 111). The system memory 103 and durable storage 104 can also store other data, such as one or more replayable execution trace(s) (i.e., execution trace(s) 112' stored in system memory 103 and/or execution trace(s) 112 stored in durable storage 104) and one or more data structure(s) 113 that support facilitate communication between operating system 110 and control logic 109 during tracing of application(s) 111.

In embodiments, the operating system 110 and the control logic 109 cooperate to record one or more replayable execution trace(s) 112/112' of execution of one or more of application(s) 111 in a manner that results in a reduced size of replayable execution trace(s) 112/112', and/or that results in a reduced utilization of processor(s) 102 to conduct the tracing, as compared to prior tracing techniques. In embodiments, this cooperation is based at least on (i) the operating system 110 maintaining one or more data structure(s) 113 that identify memory addresses to be omitted from logging during tracing of a process (e.g., because that values can be reconstructed or predicted separately from logging memory accesses by instructions that execute as part of the process), and on (ii) the processor(s) 102 using these data structure(s) 113 to omit logging of accesses to those memory addresses during tracing of the process.

In embodiments, tracing techniques utilized by the operating system 110 and control logic 109 to record replayable execution traces 112/112' are based at least on the processor(s) 102 recording influxes to their cache(s) 107 during execution of one or more threads of a process. In embodiments, operation of the operating system 110 to maintain data structure(s) 113, and operation of the processor(s) 102 to use these data structure(s) 113 to omit logging of accesses to those memory addresses results in the processor(s) 102 logging fewer influxes to their cache(s) 107 than they would have logged using prior cache-based trace recording techniques. By logging fewer influxes to the cache(s) 107 than would have logged using prior recording techniques, the embodiments herein reduce the amount of trace data stored in the replayable execution trace(s) 112/112', and reduce logging work by the processor(s) 102.

In embodiments, each replayable execution trace 112/112' comprises a "bit-accurate" record of execution of one or more threads as those thread(s) executed at the processor(s) 102. As used herein, a replayable execution trace is a "bit accurate" record of at least one thread's execution activity. This bit-accurate record enables machine code instructions that were previously executed as part of a given thread at the processing unit(s) 106 to be replayed later, such that, during replay, these machine code instructions are executed in the same order and consume the same data that they did during trace recording. While a variety of possible bit-accurate tracing approaches are possible, as mentioned, the embodiments herein record a bit-accurate execution trace based on logging at least some of the influxes to cache(s) 107 during execution of a thread. By logging at least some of these influxes during execution of the thread, a replayable execution trace 112/112' of that thread captures at least some of the memory reads that were performed by the machine code instructions that executed as part of the thread.

The cache-based tracing techniques used by the embodiments herein are built upon an observation that each processor 102 (including its the cache(s) 107) form a semi- or quasi-closed system. For example, once portions of data for an executing thread (i.e., machine code instructions and runtime data) are loaded into a processor's cache(s) 107, a processing unit 106 can continue executing that thread— without any other external input—as a semi- or quasi-closed system for bursts of time. In particular, once the cache(s) 107 are loaded with machine code instructions and runtime data, the execution unit 106 can load and execute those machine code instructions from the code portion(s) of the cache(s) 107, using runtime data stored in the data portion(s) of the cache(s) 107 as input to those machine code instructions, and using the registers 106a. So long as the data (i.e., machine code instructions and runtime data) that are needed for the processor 102 to execute that thread exits within the cache(s) 107, the processor 102 can continue executing that thread without further external input.

When a processing unit 106 needs some influx of data (e.g., because a machine code instruction it is executing, will execute, or may execute accesses code or runtime data not already in the cache(s) 107), the processor 102 may execute a "cache miss," importing data into the cache(s) 107 from the system memory 103. For example, if a data cache miss occurs when a processing unit 106 executes a machine code instruction that performs a memory operation on a memory address within application runtime 111' storing runtime data, the processor 102 imports runtime data from that memory address in the system memory 103 to one of the cache lines of the data portion of the cache(s) 107. Similarly, if a code cache miss occurs when a processing unit 106 tries to fetch a machine code instruction from a memory address within application runtime 111' storing application code, the processor 102 imports code data from that memory address in system memory 103 to one of the cache lines of the code portion of the cache(s) 107. The processing unit 106 then continues execution using the newly-imported data, until new data is needed.

In embodiments, each processor 102 is enabled to record a bit-accurate representation of execution of one or more threads executing at the processor 102, by recording, into a trace data stream corresponding the thread, sufficient data to be able to reproduce the influxes of information into the processor's cache(s) 107 as the processor's processing units 106 execute that thread's code. For example, some approaches to recording these influxes operate on a per-processing-unit basis. These approaches involve recording, for each processing unit that is being traced, at least a subset of cache misses and un-cached reads (i.e., reads from hardware components and un-cacheable memory) caused by that processing unit's activity, along with a time during execution at which each piece of data was brought into the cache(s) 107 (e.g., using a count of instructions executed or some other counter).

In some embodiment's, these tracing approaches leverage modifications to the cache(s) 107 that track whether each cache line can be considered to have been already logged by at least one processing unit 106. In embodiments, these cache modifications extend the one or more of cache(s) 107 to include addition "logging" bits (or flags). These logging bits enable the processor 102 to identify, for each cache line, one or more processing units 106 that consumed/logged the cache line. Use of logging bits can enable the processor's control logic 109 to avoid re-logging cache line influxes for a thread after a processing unit 106 transitions to another context (e.g., another thread, kernel mode, etc.) if that other context did not modify the cache line. Additionally, or alternatively, use of logging bits can enable a trace entry for one thread (or processing unit 106) to reference data already logged on behalf of another thread (or processing unit 106).

Figure 2B:
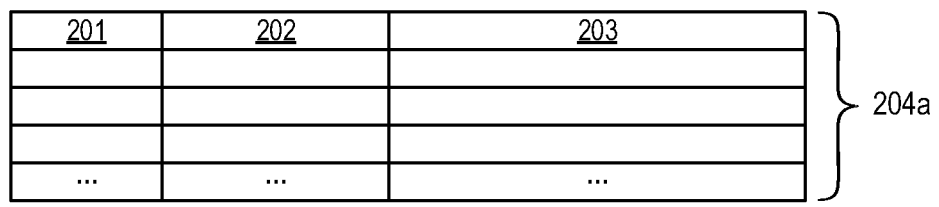
FIG. 2B illustrates an example processor cache that includes one or more bits for each cache line that are usable for tracking logging status.
Figure 2C:
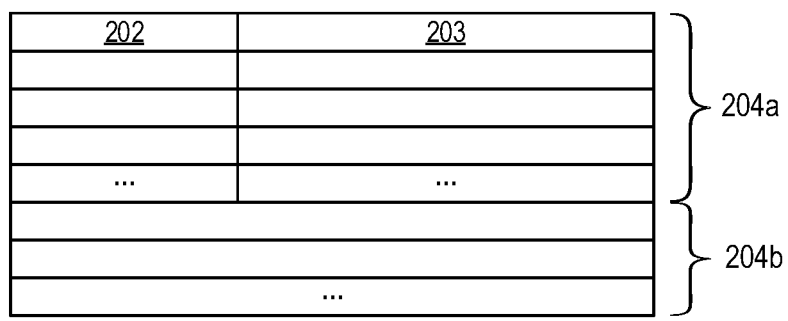
FIG. 2C illustrates an example processor cache that includes one or more reserved cache lines that are usable for tracking logging status.

In order to demonstrate these concepts, FIG. 2B illustrates an example processor cache that includes one or more bits for each cache line that are usable for tracking logging status. In particular, FIG. 2B illustrates an example cache 200b, similar to the cache 200a of FIG. 2A, in which each cache line 204a also includes a tracking portion 201 that comprises one or more tracking bit(s). Thus, in cache 200b, each cache line 204a includes a tracking portion 201, an address portion 202, and a value portion 203. Alternatively, FIG. 2C illustrates an example processor cache that includes one or more reserved cache lines that are usable for tracking logging status. In particular, FIG. 2C illustrates an example cache 200c that, like cache 200a, includes "conventional" cache lines 204a that each include an address portion 202 and a value portion 203. However, unlike cache 200a, cache 200c also includes one or more "reserved" cache line(s) 204b for storing tracking bits that apply to the conventional cache lines 204a. In some embodiments, the bits of the reserved cache line(s) 204b are allocated into different groups of accounting bits that each corresponds to a different one of the conventional cache lines 204a. In other embodiments, the reserved cache line(s) 204b are reserved as one (or more) ways in each index of a set-associative cache. For example, in an 8-way set-associative cache one way in a set could be reserved for accounting bits that apply to the other seven ways in the set. This can decrease the complexity of implementing reserved cache lines and can speed access to the reserved cache lines since all ways in a given set are typically read in parallel by most processors.

Regardless of how the tracking bit(s) are actually stored for each cache line, in embodiments each cache line's tracking are used by the processor(s) 102 to indicate whether or not the present value in the cache line was actually consumed by one or more processing unit(s) 106 that participate in logging (i.e., processing unit(s) 106 that are executing a thread(s) that are being traced).

Figure 3:
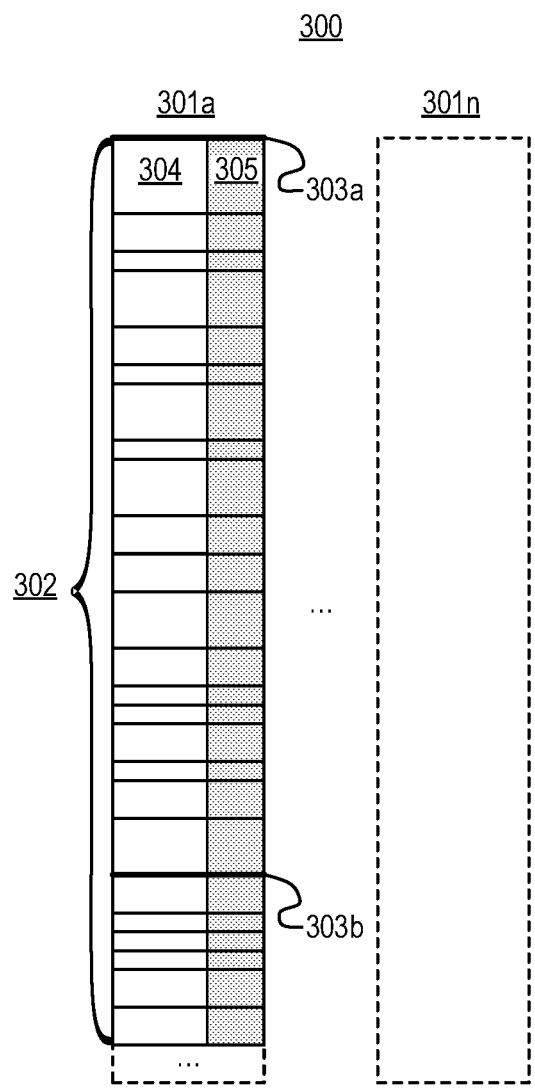
FIG. 3 illustrates an example of an execution trace.

FIG. 3 illustrates an example of an execution trace (e.g., one of execution trace(s) 112/112'). In particular, FIG. 3 illustrates an execution trace 300 that includes a plurality of data streams 301 (i.e., data streams 301a-301n). In embodiments, each data stream 301 represents execution of a different thread that executed from the code of an application 111. In an example, data stream 301a records execution of a first thread of an application 111, while data stream 301n records an nth thread of the application 11. As shown, data stream 301a comprises a plurality of data packets 302. Since the particular data logged in each data packet 302 can vary, these data packets are shown as having varying sizes. In embodiments, when using time-travel debugging technologies, a data packet 302 records the inputs (e.g., register values, memory values, etc.) to one or more executable instructions that executed as part of this first thread of the application 111. In embodiments, data stream 301a also includes one or more key frames 303 (e.g., key frames 303a and 303b) that each records sufficient information, such as a snapshot of register and/or memory values, that enables the prior execution of the thread to be replayed, starting at the point of the key frame and proceeding forward.

In embodiments, an execution trace also includes the actual code that was executed as part of an application 111. Thus, in FIG. 3, each data packet 302 is shown as including a non-shaded data inputs portion 304 and a shaded code portion 305. In embodiments, the code portion 305 of each data packet 302, if present, includes the executable instructions that executed based on the corresponding data inputs. In other embodiments, however, an execution trace omits the actual code that was executed, instead relying on having separate access to the code of the application 111 (e.g., from durable storage 104). In these other embodiments, each data packet specifies an address or offset to the appropriate executable instruction(s) in an application binary image. Although not shown, it is possible that the execution trace 300 includes a data stream 301 that stores one or more of the outputs of code execution. It is noted that used of different data input and code portions of a data packet is for illustrative purposes only, and that the same data could be stored in a variety of manners, such as by the use of multiple data packets.

If there are multiple data streams 301, each recording execution of a different thread, in embodiments these data streams include sequencing events. Each sequencing event records the occurrence of an event that is orderable across the threads. In one example, sequencing events correspond to interactions between the threads, such as accesses to memory that is shared by the threads. Thus, for instance, if a first thread that is traced into a first data stream (e.g., 301a) writes to a synchronization variable, a first sequencing event is recorded into that data stream (e.g., 301a). Later, if a second thread that is traced into a second data stream (e.g., 301b) reads from that synchronization variable, a second sequencing event is recorded into that data stream (e.g., 301b). These sequencing events are inherently ordered. For example, in some embodiments each sequencing event is associated with a monotonically incrementing value, with the monotonically incrementing values defining a total order among the sequencing events. In one example, a first sequencing event recorded into a first data stream is given a value of one, a second sequencing event recorded into a second data stream is given a value of two, etc.

It was mentioned previously that the operating system 110 and the control logic 109 cooperate to record replayable execution trace(s) 112/112' in a manner that results in a reduced size of replayable execution trace(s) 112/112', and/or that results in a reduced utilization of processor(s) 102 to conduct the tracing. It was also mentioned that this cooperation is based at least on (i) the operating system 110 maintaining one or more data structure(s) 113 that identify memory addresses to be omitted from logging during tracing of a process (e.g., because that values can be reconstructed or predicted separately from logging memory accesses by instructions that execute as part of process of the process), and on (ii) the processor 102 using these data structure(s) 113 to omit logging of accesses to those memory addresses during tracing of the process.

Figure 1B:
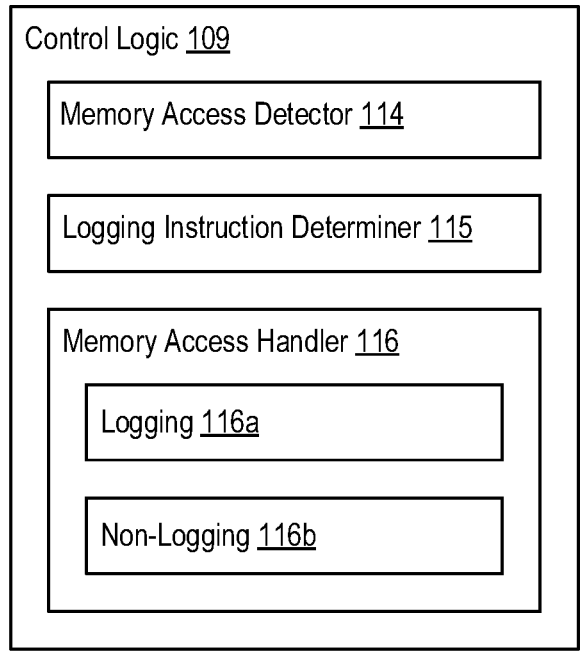
FIG. 1B illustrates an example of processor control logic that participates in omitting logging of memory addresses whose values are obtainable separately from a traced process.
Figure 1C:
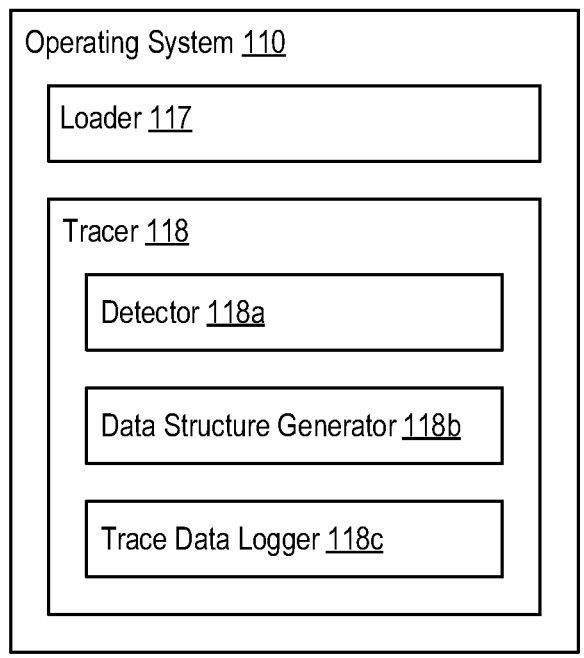
FIG. 1C illustrates an example an operating system that participates in omitting logging of memory addresses whose values are obtainable separately from a traced process.

To demonstrate some embodiments of how the operating system 110 and the control logic 109 accomplish the foregoing, FIG. 1B illustrates additional detail of control logic 109, including components (e.g., memory access detector 114, logging instruction determiner 115, memory access handler 116, etc.) that embodiments of the control logic 109 uses when participating in omitting logging of memory addresses whose values are obtainable separately from a traced process. Additionally, FIG. 1C illustrates additional detail of operating system 110, including components (e.g., loader 117, tracer 118, etc.) that embodiments of the operating system 110 uses when participating in omitting logging of memory addresses whose values are obtainable separately from a traced process. The depicted components of control logic 109 and operating system 110, together with any sub-components, represent various functions that the control logic 109 and/or the operating system 110 might implement or utilize in accordance with various embodiments described herein. It will be appreciated, however, that the depicted components—including their identity, sub-components, and arrangement—are presented merely as an aid in describing various embodiments of the control logic 109 and/or the operating system 110 described herein, and that these components are non-limiting to how software and/or hardware might implement various embodiments of the control logic 109 and/or the operating system 110 described herein, or of the particular functionality thereof.

As a general introduction to operating system 110, a loader 117 initiates execution of a process from an application 111 at the processor(s) 102. This can include for example, creating process and/or thread management data structures within operating system runtime 110', setting up a virtual memory space for the process (e.g., by configuring one or more PTEs for the process within the operating system runtime 110'), loading application code and data from durable storage 104 (e.g., application 111) into system memory 103 (e.g., application runtime 111'), initiating execution of the process (including one or more threads) at the processor(s) 102, etc.

A tracer 118 provides operating system-level support for tracing execution of one or more threads at the processor(s)

102, including creating and/or maintaining data structures 113 for use by control logic 109 to omit logging of some memory addresses that are part of the memory space of a process initiated by the loader 117. In embodiments, the tracer 118 executes as a kernel-mode component of operating system 110, though in various other embodiments it could execute as a user-mode component of operating system 110, or have both user-mode and kernel mode portions. In some embodiments, tracer 118 is distributed as a component of operating system 110 itself, while in other embodiments tracer 118 is provided to operating system 110 (e.g., by an application 111) as an extension to operating system 110 (e.g., as an operating system driver, kernel extension, kernel module, etc.). Thus, even though tracer 118 is illustrated executing (at least in part) as a component of operating system 110, tracer 118 could actually be provided to operating system 110 by a third-party.

A detector 118a identifies memory addresses within a memory space of a process (i.e., a process initiated by the loader 117) that contain values that could be obtained (e.g., reconstructed or predicted) separately from logging memory accesses, such as reads, by machine code instructions that execute as part of the process. Examples of how memory values could be separately obtained are described later. In embodiments, the detector 118a identifies such memory addresses in connection with those addresses being configured as part of the memory space for the process, such as in connection with initial loading of the process by the loader 117, in connection with mapping a file to the process, in connection with configuring the process to access direct memory access (DMA) hardware, etc. Based on the detector 118a having determined that there are memory addresses that contain values that could be separately obtained, a data structure generator 118b configures data structures 113 for communicating to the processor 102 that logging of accesses to these memory addresses can be omitted when tracing any of the process' threads. Examples of different types of data structures 113 are described later. Also based on the detector 118a having determined that there are memory addresses that contain values that could be separately obtained, a trace data logger 118c may log information into an execution trace 112/112' indicating how to separately obtain the values of these memory addresses. Examples of different types of information that the trace data logger 118c could log are described later.

As a general introduction to control logic 109, a memory access detector 114 detects when an executing thread makes an access (e.g., a read) to a particular memory address. Based at least on the memory access having been detected by the memory access detector 114 a logging instruction determiner 115 utilizes information stored in data structures 113 to determine whether or not the processor 102 has been instructed to omit logging of accesses to that memory address. A memory access handler 116 processes the memory access. The memory access handler 116 includes logging logic 116a that is invoked based at least on the logging instruction determiner 115 having determined that the data structures 113 do not instruct the processor 102 to omit logging of accesses to the memory address, as well as non-logging logic 116b that is invoked based at least on the logging instruction determiner 115 having determined that the data structures 113 do instruct the processor 102 to omit logging of accesses to the memory address.

Figure 5:
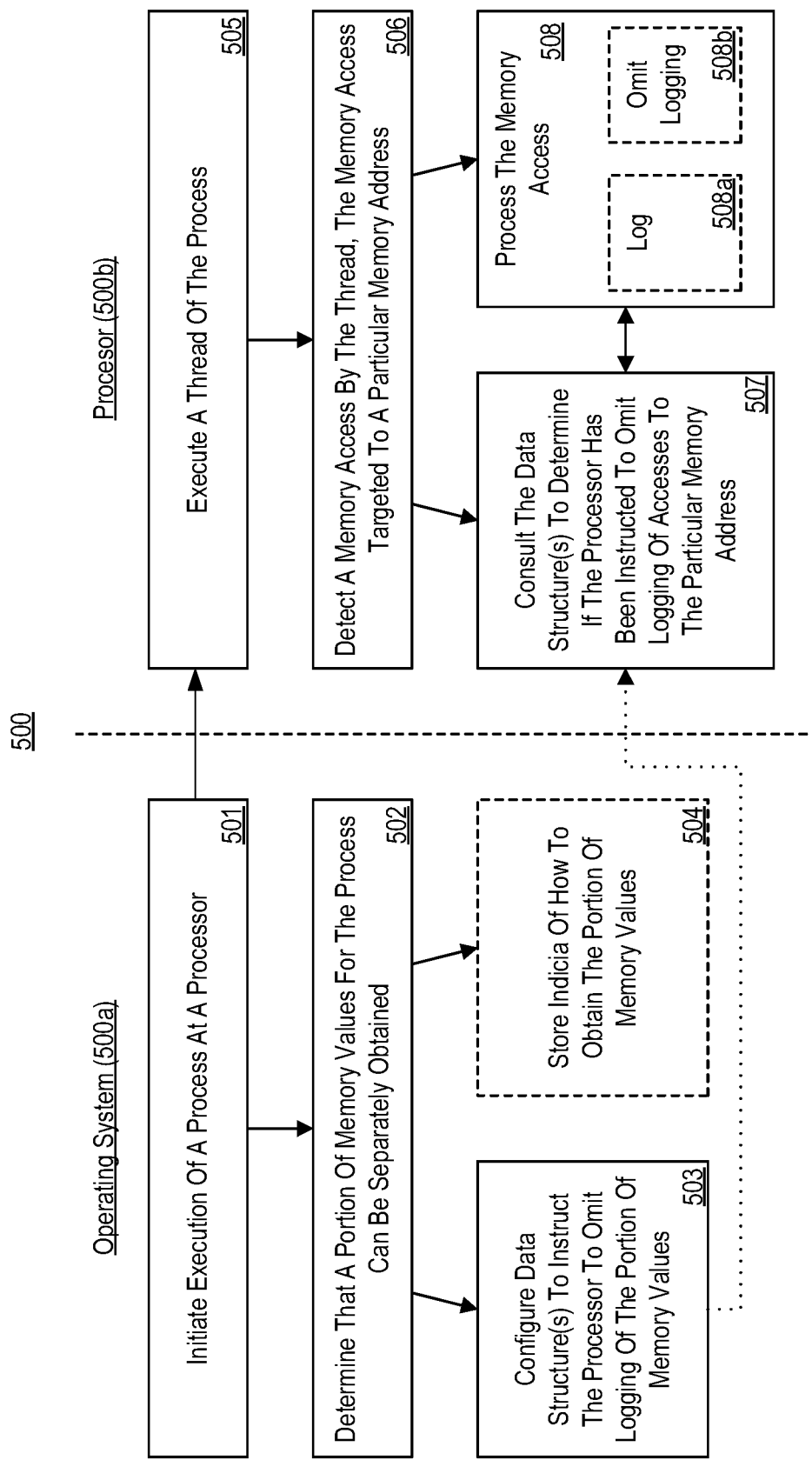
FIG. 5 illustrates a flow chart of an example method for a computer system to instruct a processor to omit logging of memory addresses whose values can be reconstructed or predicted, and for a processor to make a logging decision based on accessing an identification of memory addresses for which the processor is instructed to omit logging.

Further operation of the control logic 109 and operating system 110 are now described in greater detail, primarily in connection with FIG. 5, which illustrates a flow chart of an example method 500 for a computer system to instruct a processor to omit logging of memory addresses whose values can be reconstructed or predicted, and for a processor to make a logging decision based on accessing an identification of memory addresses for which the processor is instructed to omit logging). The following discussion refers to a number of methods and method acts. Although the method acts may be discussed in a certain order, or may be illustrated in a flow chart as occurring in a particular order, no particular ordering is required unless specifically stated, or required because an act is specifically described as being dependent on another act being completed prior to the act being performed.

Referring to FIG. 5, method 500 includes acts 501-504 that are performed by an operating system (e.g., operating system 110), and acts 505-508 that are performed by a processor (e.g., processor 102 based on control logic 109). As such, method 500 can be viewed as either a single method implemented and performed by computer system 101 (which includes both the operating system 110 and the processor 102), or as separate methods—one (i.e., method 500a, comprising acts 501-504) that is implemented by operating system 110 and that is performed in connection with execution of operating system 110, and another (i.e., method 500b, comprising acts 505-508) that is separately implemented by processor 102 and that is performed by operation of processor 102.

Referring initially to operating system 110, method 500a (e.g., performed by operation of the operating system) includes an act of 501 of initiating execution of a process at a processor. In some embodiments, act 501 comprises initiating execution of a process based on an application binary, the process including one or more threads. In an example, the loader 117 initiates execution of one of application(s) 111 at the processor(s) 102. In the example, this includes one or more of the loader 117 setting up process and/or thread management data structure(s) within operating system runtime 110', the loader 117 configuring a virtual memory space for the process, the loader 117 loading at least a portion of code and runtime data of the application 111 into an application runtime 111', or the loader 117 initiating execution of one or more threads of the process at the processor(s) 102.

Method 500a also includes an act of 502 of determining that a portion of memory values for the process can be separately obtained. In some embodiments, act 502 comprises, based at least on configuring a memory space for a process, determining that memory values corresponding to a particular range of memory addresses within the memory space for the process can be reconstructed or predicted separately from logging memory accesses by instructions that execute as part of process. In an example, during execution of the process, the operating system 110 configures a memory space for the process. This configuration could be performed by the loader 117 while initiating execution of the process and/or at some other time during execution of the process. Regardless of when the memory space configuration is performed, in the example, the detector 118a determines that a range of memory addresses within this configured memory space can be reproduced by means other than the processor logging access, such as reads, to those memory locations by machine code instructions as those instructions execute as part of the process at the processor(s) 102.

Figure 4:
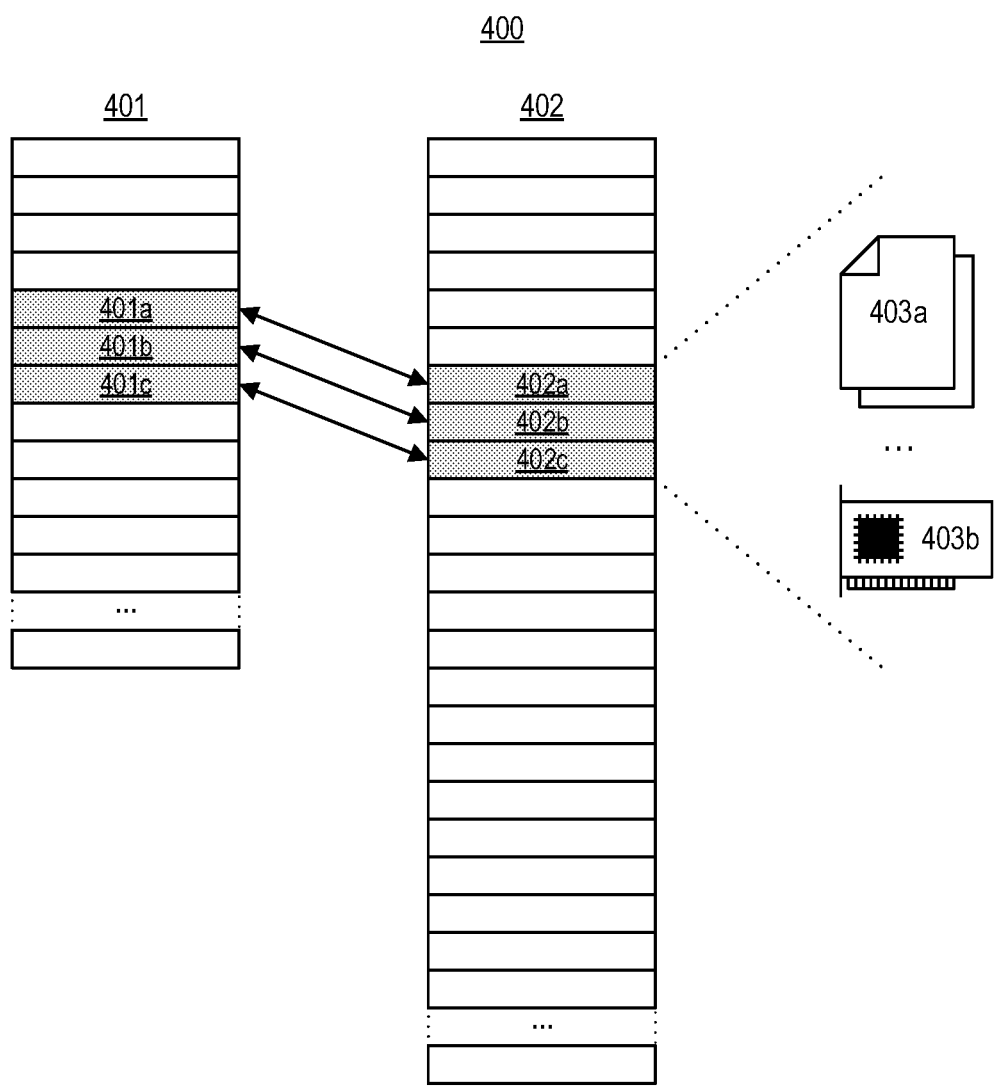
FIG. 4 illustrates an example of memory address space mappings.

In order to demonstrate how a range of memory addresses within the memory space for a process could potentially be reconstructed or predicted separately from logging memory accesses by instructions that execute as part of a process, FIG. 4 illustrates an example 400 of memory address space mappings. In particular, example 400 illustrates a physical address space 401, such as corresponding to physical addresses in system memory 103. In addition, example 400 illustrates a virtual address space 402, such as corresponding to a virtual address in the memory space for the process initiated in act 501. While address spaces 401 and 402 are illustrated as comprising only a small number of addressable memory locations, the ellipses within each of address space 401 and address space 402 indicate that these address spaces can include many more addressable memory locations than those illustrated. Notably, physical address space 401 is shown in example 400 as being smaller that virtual address space 402, to emphasize that physical and virtual address spaces need not be equal in size, and that the amount of available physical memory in a computer system is frequently smaller than the virtual memory space presented to each executing process.

In example 400, the virtual address space 402 contains a region of three virtual addresses 402a-402c that map to predicable data sources 403. In example 400, that virtual addresses 402a-402c map to at least a portion of one or more files 403a, or to a predicable memory-mapped hardware device 403b (e.g., using DMA). The ellipses between files 403a and hardware device 403b indicate that these are non-limiting examples of predicable data sources 403.

In one example, the predicable data source 403 corresponds to the application binary file from which the process was initiated in act 501. In this example, the range of memory addresses within the process's memory space (e.g., virtual addresses 402a-402c) corresponds to at least a portion of this binary file, and the values of these memory addresses are separately obtainable from the binary file. For instance, virtual addresses 402a-402c could correspond to read-only portion(s) of a .data section of the binary (e.g., global variables stored within the binary file), to a .text section of the binary (e.g., the binary's machine code instructions), and/or to an application programming interface (API) table of the binary (e.g., an import and/or export table).

In another example, the predicable data source 403 corresponds to a file from which the process reads and/or to which the process writes (e.g., as a data file, a log file, etc.). In this example, the range of memory addresses within process's memory space (e.g., virtual addresses 402a-402c) corresponds to memory that is used to load the file in its entirety, or that is used as a buffer to scan through the file incrementally, and the values of these memory addresses are separately obtainable from the file.

In another example, the predicable data source 403 corresponds to at least a portion of a memory paging information (e.g., a page file, a swap partition, etc.). In this example, the range of memory addresses within the process's memory space (e.g., virtual addresses 402a-402c) corresponds to memory addresses that have been paged out to disk (e.g., durable storage 104), and the values of these memory addresses are separately obtainable from disk.

In another example, the predicable data source 403 corresponds to a memory-mapped hardware device. In this example, the range of memory addresses within the process's memory space (e.g., virtual addresses 402a-402c) corresponds to memory addresses that are mapped to that hardware device, and the values of these memory addresses are separately obtainable from the hardware device, itself, or via emulation of the hardware device. For instance, virtual addresses 402a-402c could correspond to hardware ROM, or to a DMA device that exhibits deterministic and reproducible memory behaviors.

In another example, the predicable data source 403 corresponds to memory written to by a predictable software routine (e.g., as an output of the routine, or as a side-effect of execution of the routine). In this example, the range of memory addresses within the process's memory space (e.g., virtual addresses 402a-402c) corresponds to memory addresses that are affected by execution of that software routine, and the values of these memory addresses are separately obtainable via execution or emulation of the routine, or via knowledge of outputs of that routine.

In another example, the predicable data source 403 corresponds to memory that can be reconstructed through well-known processes. In this example, the range of memory addresses within process's memory space (e.g., virtual addresses 402a-402c) corresponds to memory that modified by known processes, and the values of these memory addresses can be separately obtained by repeating these processes. For instance, virtual addresses 402a-402c could correspond to an API import and/or export table that has been modified by well-known processes performed by the loader 117 during initialization of the process in act 501 (e.g., to link to external libraries), and the values of virtual addresses 402a-402c are separately obtainable by repeating the loader 117's modifications.

In another example, the predicable data source 403 corresponds to memory that can be reconstructed based on tracing execution of an external entity. In this example, the range of memory addresses within process's memory space (e.g., virtual addresses 402a-402c) corresponds to memory that is modified by an external entity, and the values of these memory addresses are separately obtainable by tracing execution of this this external entity and by replaying that traced execution.

In another example, the predicable data source 403 corresponds to memory that is separately log-able. In this example, the range of memory addresses within process's memory space (e.g., virtual addresses 402a-402c) corresponds to memory that can be logged, and the values of these memory addresses are separately obtainable from a log. For instance, virtual addresses 402a-402c could correspond to memory for which there exists a memory snapshot, a memory diffgram, etc., or for which a memory snapshot, a memory diffgram, etc. could be made.

In another example, the predicable data source 403 corresponds to memory that is being written to by the process. In this example, the range of memory addresses within process's memory space (e.g., virtual addresses 402a-402c) corresponds to memory that is the subject of those writes, and the values of these memory addresses are separately obtainable by tracing those writes. Note that this is contrary to traditional cache-based tracing techniques, which typically record influxes to a cache (i.e., reads), but not writes to the cache.

In view of the foregoing examples it will be appreciated that, in various embodiment of act 502, determining that the memory values corresponding to the particular range of memory addresses within the memory space for the process can be reconstructed or predicted separately from logging memory accesses by instructions that execute as part of process comprises at least one of determining that the particular range of memory addresses maps to data of a file (e.g., an application binary, a data file, a log file, etc.); determining that the particular range of memory addresses corresponds to a memory-mapped device (e.g., a ROM device, a DMA device, etc.) having a known behavioral pattern; determining that the particular range of memory addresses stores a result of a software routine having a known behavioral pattern; determining that the particular range of memory addresses corresponds to at least one of a binary import table or a binary export table (e.g., as part of an application binary and/or as modified by operating system 110); determining that the particular range of memory addresses corresponds to a memory page stored in a memory page file or partition; determining that the particular range of memory addresses corresponds to data that is separately log-able (e.g., from a memory snapshot, a memory diffgram, etc.); or determining that the particular range of memory addresses corresponds to data that can be reconstructed through replay of traced executable instructions (e.g., of some external entity).

Method 500*a* also includes an act of 503 of configuring data structure(s) to instruct the processor to omit logging of the portion of memory values. In some embodiments, act 503 comprises, based at least on the determination in act 501, configuring one or more data structures that instruct the processor to omit logging memory accesses into a trace of the process when the processor accesses a memory address within the particular range of memory addresses during execution of the process at the processor. In some embodiments, the data structure generator 118*b* creates data structures(s) 113 that provide an indication that logging of the particular range of memory addresses can be omitted during execution of the process at the processor(s) 102. In other embodiments, the data structure generator 118*b* modifies existing data structures(s) 113 such that they provide an indication that logging of the particular range of memory addresses can be omitted during execution of the process at the processor(s) 102. The exact form of data structures(s) 113 varies depending on embodiment. Although the data structures 113 are depicted within system memory 103, in some embodiments they are at least partially stored in one or more of registers 106*a* or TLB(s) 108. In addition, although the data structures(s) 113 are depicted as being separate from operating system runtime 110', it will be appreciated that in some embodiments the data structures(s) 113 could be part of operating system runtime 110', at least in part.

In some embodiments, the data structures(s) 113 comprise memory page tables, and the data structure generator 118*b* modifies one or more PTEs within these page tables to indicate that logging of accesses to one or more corresponding memory page(s) (i.e., corresponding to the particular range of memory addresses) can be omitted during execution of the process at the processor(s) 102. In some embodiments, the data structure generator 118*b* indicates that logging of accesses memory page can be omitted by modifying one or more flag bits within a PTE. In some embodiments, the operating system 110 extends each PTE to include new flag bit(s) for signaling logging omission, and the data structure generator 118*b* modifies these new flag bit(s). In other embodiments, the data structure generator 118*b* sets an existing set of flag bits to a state that would be otherwise invalid or illegal—such as to indicate that a memory page is both read-only and dirty. Thus, in some embodiments of act 503, configuring the one or more data structures that instruct the processor to omit logging when the processor accesses the memory address within the particular range of memory addresses comprises configuring a PTE of a corresponding memory page overlapping with the particular range of memory addresses, the PTE including one or more PTE flags that indicate that logging of memory accesses to memory addresses within the corresponding memory page should be omitted by the processor.

In some embodiments, the data structures(s) 113 comprise one or more bitmaps, and the data structure generator 118*b* modifies one or more bits in the bitmap(s) to indicate that logging of accesses to one or more memory regions corresponding to those bit(s) can be omitted during execution of the process at the processor(s) 102. The particular amount of memory that corresponds to each bit can vary depending on implementation. In various embodiments, each bit corresponds to one of a memory page, a cache line, or some arbitrary size of memory. In embodiments, if each bit corresponds to some arbitrary size of memory, the data structure generator 118*b* stores this data size within at least one of registers 106*a*. Thus, in some embodiments of act 503, configuring the one or more data structures that instruct the processor to omit logging when the processor accesses the memory address within the particular range of memory addresses comprises creating a bitmap, a bit in the bitmap associated with a corresponding memory address range overlapping with the particular range of memory addresses, the bit indicating that logging of memory accesses to memory addresses within the corresponding memory address range should be omitted by the processor.

In some embodiments, at least a portion of the data structures(s) 113, or pointers thereto, are stored within registers 106*a*. In one embodiment, for example, the data structure generator 118*b* stores an identity of the particular range of memory addresses within one or more of registers 106*a*. For instance, in some embodiments the data structure generator 118*b* stores an identity of the particular range of memory addresses within a breakpoint comparator register (e.g., in reference to a beginning memory address and an offset, such as by reference to a data size, and ending memory address, etc.). In another embodiment, the data structure generator 118*b* stores a pointer to the previously-discussed bitmap within one or more of registers 106*a* to enable the processor 102 to locate the bitmap within system memory 103. In another embodiment, the data structure generator 118*b* stores a size of the data referenced by each bit on the bitmap within one or more of registers 106*a* to enable the processor 102 to identify which memory ranges correspond to each bit in the bitmap. Thus, in some embodiments of act 503, configuring the one or more data structures that instruct the processor to omit logging when the processor accesses the memory address within the particular range of memory addresses comprises configuring a processor register of the processor with at least one of a base memory address or a memory size, wherein at least one of the base memory address or the memory size identify at least one of (i) where to locate the bitmap, or (ii) the particular range of memory addresses.

In embodiments, when configuring data structures(s) 113, the data structure generator 118*b* identifies the particular range of memory addresses for which logging can be omitted by reference to virtual memory addresses. Thus, in reference to FIG. 4, in these embodiments the data structure(s) 113 refer to a range of memory addresses that includes virtual addresses 402*a*-402*c*. In other embodiments, when configuring data structures(s) 113, the data structure generator 118*b* identifies the particular range of memory addresses for which logging can be omitted by reference to physical memory addresses. Thus, in reference to FIG. 4, in these embodiments the data structure(s) 113 refer to physical addresses 401*a*-401*c*, which map to virtual addresses 402*a*-402*c*.

In some embodiments, as a result of having configured the one or more data structures that instruct the processor to omit logging memory accesses into the trace of the process in act 503, the processor omits logging of a memory access by the process to a memory address within the particular range of memory addresses (i.e., act 508*b* of method 500*b*). For example, in embodiments, based on detecting a memory access by an executable instruction that executes as part of the process (i.e., act 505 of method 500*b*), processor 102 accesses the one or more data structures to determine if the processor 102 has been instructed to omit logging of the detected memory access into the trace corresponding to the process (i.e., act 507 of method 500*b*), and then omits logging of the detected memory access (i.e., act 508*b* of method 500*b*).

Method 500*a* also includes an act of 504 of storing indicia of how to obtain the portion of memory values. In some embodiments, act 504 comprises, based at least on the determination in act 501, storing one or more indicia of how to reconstruct or predict the memory values corresponding to the particular range of memory addresses. In an example, the trace data logger 118*c* can log any appropriate information for reconstructing or predicting the values of the memory range identified in act 502, such as into execution trace(s) 112/112'.

Returning to the examples discussed in connection with act 502, if the predicable data source 403 corresponds to the application binary file from which the process was initiated in act 501, then in embodiments the trace data logger 118*c* logs an identity of the binary (or logs the binary, itself), along with at least a beginning address at which the binary was loaded into the process' memory space. For example, the trace data logger 118*c* could log the identity of the binary based on one or more of a file name, a file unique identifier, a file hash, a file signature, etc. Notably, by logging one or more indicia of a binary file from which the process was initiated in act 502 (either by logging the binary itself or by logging a reference to that binary), a size of a replayable execution trace 112/112' can be reduced, and tracing overhead can be reduced, since this data is logged once, instead of potentially many times as the process repeatedly accesses the same data.

Similarly, if the predicable data source 403 corresponds to a file from which the process reads and/or to which the process writes (e.g., as a data file, a log file, etc.), then in embodiments the trace data logger 118*c* logs an identity of the file (or logs the file, itself). Notably, by logging one or more indicia of a file process accesses (either by logging the binary itself or by logging a reference to that binary), a size of a replayable execution trace 112/112' can be reduced, and tracing overhead can be reduced, since this data is logged once, instead of potentially many times as the process repeatedly accesses the same data.

If the predicable data source 403 corresponds to at least a portion of a memory paging information, then in embodiments the trace data logger 118*c* logs an identity of a memory page stored on disk, or at least a portion of contents of the memory page stored on disk. Notably, by logging a reference to paged data, or the paged data itself, a size of a replayable execution trace 112/112' can be reduced, and tracing overhead can be reduced, since this data is logged once, instead of potentially many times as the process repeatedly accesses the same data.

If the predicable data source 403 corresponds to a memory-mapped hardware device, then in embodiments trace data logger 118*c* logs an identifier of a memory-mapped device, state information for the memory-mapped device, etc.) at least a beginning address at which the device is mapped, etc. Notably, by logging a reference to a memory-mapped hardware device, a size of a replayable execution trace 112/112' can be reduced, and tracing overhead can be reduced, since this data can be reproduced later via accessing or emulating the memory-mapped hardware device.

If the predicable data source 403 corresponds to memory written to by a predicable software routine, then in embodiments trace data logger 118*c* logs an identifier of the software routine, memory location(s) the software routine modifies, etc. Notably, by logging a reference to a predicable software routine, a size of a replayable execution trace 112/112' can be reduced, and tracing overhead can be reduced, since behavior of this software routine can be reproduced later.

If the predicable data source 403 corresponds to memory that can be reconstructed through a well-known process, then in embodiments trace data logger 118*c* logs an identity of that process, memory location(s) the process modifies, etc. Notably, by logging a reference to well-known process, a size of a replayable execution trace 112/112' can be reduced, and tracing overhead can be reduced, since behavior of this process can be reproduced later.

If the predicable data source 403 corresponds to memory that can be reconstructed based on tracing execution of an external entity, then in embodiments the trace data logger 118*c* logs an execution trace of that external entity. Notably, by tracing execution of an external entity, a size of a replayable execution trace 112/112' can be reduced, and tracing overhead can be reduced, since this external entity can be replayed later.

If the predicable data source 403 corresponds to memory that is separately log-able, then in embodiments the trace data logger 118*c* logs that memory (e.g., as a memory snapshot, a diffgram, etc.). Notably, by logging a reference to logged memory, a size of a replayable execution trace 112/112' can be reduced, and tracing overhead can be reduced, since this data is logged once, instead of potentially many times as the process repeatedly accesses the same data.

If the predicable data source 403 corresponds to memory that is being written to by the trace process, then in embodiments the trace data logger 118*c* logs those writes. Notably, by logging writes, a size of a replayable execution trace 112/112' can be reduced, and tracing overhead can be reduced, since these writes are logged once, instead of potentially many times as the process repeatedly reads from the values written later.

In view of the foregoing examples it will be appreciated that, in various embodiment of act 504, storing the one or more indicia of how to reconstruct or predict the memory values corresponding to the particular range of memory addresses comprises, for at least one memory address within the particular range of memory addresses, storing at least one of the following into a trace: an indication of at least a beginning address in the particular range of memory addresses; one or more of a file name, a file unique identifier, a file hash, or a file signature; an identifier of a memory-mapped device; an identifier of a software routine; at least one of an identity of a memory page stored in a memory page file or partition, or at least a portion of contents of the memory page stored in the memory page file or partition; one or more writes to the particular range of memory addresses; or at least a portion of contents of the particular range of memory addresses.

Notably, in many situations the condition(s) that enable memory values corresponding to a given range of memory addresses to be reconstructed or predicted could be temporary. For example, when the loader 117 loads a module into a range of addresses within a process' memory space the values of that range may become reconstructable (e.g., via later access to the module binary, itself). Later, however, the operating system 110 may unload this module from the process's memory space, thereby making this range is no longer reconstructable going forward. In embodiments, when this happens the tracer 118 updates the data structure(s) 113 so that they no longer instruct the processor 102 to omit logging for this range of addresses going forward. In embodiments, the tracer 118 also adds information to the replayable execution trace(s) 112/112' to reflect this change in logging for the range of addresses. Thus, it will be appreciated that some embodiments of method 500a repeat one or more of acts 502-504 based at least on a memory space reconfiguration.

Turning to the processor, method 500b (e.g., performed based at least on operation of control logic 109 at one or more of processor(s) 102) includes an act of 505 of executing a thread of the process. In some embodiments, act 505 comprises executing a thread corresponding to a process at one or more processing units of the processor. In an example, based on act 501 at the operating system, the processor 102 can initiate execution of a thread of a process at a processing unit 106. In the example, this includes the processor 102 loading at least some machine code instructions from application runtime 111' into a code portion of the cache(s) 107, and the processor 102 loading at least some runtime data from application runtime 111' into a data portion of the cache(s) 107. In addition, in the example, this can include the processor 102 caching at least one PTE corresponding to a memory space for the process into the TLB(s) 108.

Method 500b also includes an act of 506 of detecting a memory access by the thread, the memory access targeted to a particular memory address. In some embodiments, act 506 comprises, during execution of a thread corresponding to a process that executes at the one or more processing units, detecting a memory access by an executable instruction that executes as part of the thread, the memory access being targeted at a particular memory address within a memory space for the process. In an example, the memory access detector 114 detects when a machine code instruction of a thread of the process initiated in act 501 performs a memory access (e.g., a read or a write) to a memory location in system memory 103 (e.g., via a request to the cache(s) 107).

From act 506, method 500b can proceed to one or both of an act 507 of consulting the data structure(s) to determine if the processor has been instructed to omit logging of the accesses to the particular memory address, or an act 508 of processing the memory access. Thus, in some embodiments, at least portions of acts 507 and 508 could be performed in parallel, and/or some portions of acts 507 and 508 could be performed serially. For example, in some embodiments, the processor 102 determines if the processor has been instructed to omit logging of the accesses to the particular memory address before it actually processes the memory access; in these embodiments, the processor 102 completes act 507 prior to proceeding to act 508. In other embodiments, the processor 102 processes the memory access, at least in part, prior to determining if it been instructed to omit logging of the memory accesses; in these embodiments, the processor may complete at least a portion of act 508 before proceeding to act 507, or while also proceeding to act 507.

In some embodiments, act 507 comprises, based at least on detecting the memory access in act 506, determining if the processor has been instructed to omit logging of accesses to the particular memory address into a trace corresponding to the process, including checking one or more data structures that identify at least one range of memory addresses within the memory space for the process, accesses to which the processor is instructed to omit logging during execution of the process at the one or more processing units. In an example, the logging instruction determiner 115 accesses data structures(s) 113, or a portion thereof, to determine if the accessed memory address is within a range or memory address for which logging can be omitted. Notably, in embodiments the logging instruction determiner 115 can operate regardless of whether the accessed memory address has already been cached in the cache(s) 107, or not. Thus, in act 507 the processor can determine if the processor has been instructed to omit logging of accesses in connection with at least one of processing a cache miss for the particular memory address, or locating an existing cache line overlapping with the particular memory address.

In various embodiments, the logging instruction determiner 115 accesses data structures 113 directly (i.e., from system memory 103) and/or via on-processor storage (e.g., registers 106a, cache(s) 107, TLB(s) 108, etc.). For example, if the data structures(s) 113 comprise memory page tables, then in embodiments the logging instruction determiner 115 accesses a PTE corresponding to the accessed memory address from TLB(s) 108 and determines if flag bit(s) in that PTE indicate if logging can be omitted for a corresponding memory page. Thus, in embodiments of act 507, checking the one or more data structures comprises identifying, from a PTE of a corresponding memory page containing the particular memory address, one or more PTE flags that indicate whether or not logging of memory accesses to memory addresses within the corresponding memory page should be omitted. If the corresponding memory page does overlap with the at least one range of memory addresses, then in embodiments checking the one or more data structures comprises identifying the one or more PTE flags, the one or more PTE flags indicating that logging of memory accesses to the memory addresses within the corresponding memory page should be omitted.

In another example, if the data structures(s) 113 comprise a bitmap stored in system memory 103, then in embodiments the logging instruction determiner 115 reads the bitmap from system memory 103 and/or from the cache(s) 107, and determines a bit in that bitmap indicates if logging can be omitted for a memory range that includes the accessed memory address. Thus, in embodiments of act 507, checking the one or more data structures comprises identifying, from a bitmap, a bit associated with a corresponding memory address range containing the particular memory address, the bit indicating whether or not logging of memory accesses to memory addresses within the corresponding memory address range should be omitted. If the corresponding memory page does overlap with the at least one range of memory addresses, then in embodiments checking the one or more data structures comprises identifying the one or more PTE flags, the one or more PTE flags indicating that logging of memory accesses to the memory addresses within the corresponding memory page should be omitted.

In another example, if the data structure generator 118b stored information in one or more of registers 106a (e.g., a memory range within a breakpoint comparator register, a pointer to the bitmap, a size of the data referenced by each bit on the bitmap, etc.) the logging instruction determiner 115 can consult a processor register, as appropriate. Thus, in embodiments of act 507, checking the one or more data structures comprises identifying, from a processor register, at least one of a base memory address or a memory size that are usable to determine whether or not logging of the memory access targeted at the particular memory address should be omitted. In embodiments, checking the one or more data structures comprises identifying at least one of the base memory address or the memory size. In embodiments, at least one of the base memory address or the memory size identify at least one of (i) where to locate the bitmap, or (ii) the at least one range of memory addresses.

In some embodiments, the control logic 109 only performs act 507 if logging is actually enabled for the thread that made the memory access at the time that the memory access was detected in act 506. Thus, in these embodiments, the act of determining if the processor has been instructed to omit logging of accesses to the particular memory address is further based on determining that logging is enabled for the thread.

In some embodiments, act 508 comprises, in response to determining if the processor has been instructed to omit logging of accesses to the particular memory address in act 507, performing one of (i) an act 508a of, based at least on it being determined that the processor has not been instructed to omit logging of accesses to the particular memory address, logging the memory access into the trace when using the cache to process the memory access; or (ii) an act 508b of, based at least on having determined that the processor has been instructed to omit logging of accesses to the particular memory address, omitting logging the memory access when using the cache to process the memory access. In an example, the memory access handler 116 can process the memory access in any appropriate manner, such as by locating an existing cache line within the cache(s) 107 that corresponds to the accessed memory address, or processing a cache miss on the accessed memory address in order to import data corresponding to the accessed memory address into the cache(s) 107. In various embodiments, this processing is completed either prior to the logging instruction determiner 115 having determined if the processor has been instructed to omit logging of the memory access in act 507, or after the logging instruction determiner 115 having determined if the processor has been instructed to omit logging of the memory access in act 507. Regardless, based on the determination in act 507, the memory access handler 116 either uses logging logic 116a to log the memory access, or uses non-logging logic 116b to omit logging of the memory access.

In embodiments, the logging logic 116a and/or the non-logging logic 116b manages tracking bits (e.g., tracking portion 201 or reserved cache lines 204b) to reflect whether or not the cache line corresponding to the memory access has been logged. For example, in embodiments, omitting logging of the memory access when using the cache to process the memory access comprises at least one of (i) setting a tracking bit for a cache line in the cache that overlaps with the particular memory address, (ii) or refraining from setting the tracking bit for the cache line in the cache that overlaps with the particular memory address. For example, even though logging has been omitted, in some embodiments the non-logging logic 116b marks one or more tracking bits corresponding to the cache line to indicate that the cache line has been logged. By doing so, some embodiments of the control logic 109 refrain from invoking the logging instruction determiner 115 if there is a future access to the same cached data (i.e., because the cache line has already been marked as logged). Alternatively, in some embodiments the logging logic 116 refrains from marking these tracking bit(s). By doing so, some embodiments of the control logic 109 invokes the logging instruction determiner 115 if there is a future access to the same cached data (i.e., because the cache line is not already marked as logged).

Additionally, in embodiments, logging the memory access into the trace when using the cache to process the memory access comprises at least one of (i) setting a tracking bit for a cache line in the cache that overlaps with the particular memory address, or (ii) determining that the tracking bit for the cache line in the cache that overlaps with the particular memory address has already been set. For example, if the cache line already exists in the cache 107 but has not yet been marked as logged, in some embodiments the logging logic 116a marks one or more tracking bits to corresponding the cache line to indicate that the cache line has been logged. If these tracking bit(s) have already been set to indicate that the cache line has been logged, then in some embodiments the logging logic 116a preserves this marking status.

Notably, in some embodiments of method 500b, the processor actually determines that the processor has been instructed to omit logging of accesses to the particular memory address in act 507, and thus the processor omits logging the memory access when using the cache to process the memory access in act 508b. In other embodiments of method 500b, the processor actually determines that the processor has not been instructed to omit logging of accesses to the particular memory address in act 507, and thus the processor logs the memory access into the trace when using the cache to process the memory access in act 508a.

Accordingly, at least some embodiments described herein reduce at least one of (i) the size of a replayable execution trace of the program, or (ii) the processor overheads associated with recording the replayable execution trace of the program based on identifying memory addresses within a process' memory space whose values can be reconstructed or predicted separately from memory accesses by instructions that execute as part of the process, and instruct a processor to omit logging of accesses to these memory addresses when the processor is tracing execution of the process. Correspondingly, a processor makes logging decisions during tracing of a process based on accessing an identification of memory addresses for which the processor has been instructed to omit logging.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed is:

1. A computer system comprising:
   a processor; and
   a computer-readable medium having stored thereon computer-executable instructions that are executable by the processor to cause the computer system to instruct the processor to omit logging of accesses to memory addresses whose values can be reconstructed or predicted, the computer-executable instructions including instructions that are executable by the processor to cause the computer system to at least:
      based at least on configuring a memory space for a process, determine that memory values corresponding to a particular range of memory addresses within the memory space for the process can be reconstructed or predicted from a data source that is separate from traced memory accesses by instructions that execute as part of the process; and
      based at least on the determination,
         configure one or more data structures that instruct the processor to omit logging memory accesses into a trace of the process when the processor accesses a memory address within the particular range of memory addresses during execution of the process at the processor; and
         store one or more indicia of how to reconstruct or predict the memory values corresponding to the particular range of memory addresses, the one or more indicia indicating at least an identity of the data source that is separate from the traced memory accesses.

2. The computer system of claim 1, wherein determining that the memory values corresponding to the particular range of memory addresses within the memory space for the process can be reconstructed or predicted separately from logging memory accesses by instructions that execute as part of the process comprises at least one of:
   determining that the particular range of memory addresses maps to data of a file;
   determining that the particular range of memory addresses corresponds to a memory-mapped device having a known behavioral pattern;
   determining that the particular range of memory addresses stores a result of a software routine having a known behavioral pattern;
   determining that the particular range of memory addresses corresponds to at least one of a binary import table or a binary export table;
   determining that the particular range of memory addresses corresponds to a memory page stored in a memory page file or partition;
   determining that the particular range of memory addresses corresponds to data that is separately log-able; or
   determining that the particular range of memory addresses corresponds to data that can be reconstructed through replay of traced executable instructions.

3. The computer system of claim 1, wherein configuring the one or more data structures that instruct the processor to omit logging when the processor accesses the memory address within the particular range of memory addresses comprises at least one of:
   configuring a page table entry (PTE) of a corresponding memory page overlapping with the particular range of memory addresses, the PTE including one or more PTE flags that indicate that logging of memory accesses to memory addresses within the corresponding memory page should be omitted by the processor;
   creating a bitmap, a bit in the bitmap associated with a corresponding memory address range overlapping with the particular range of memory addresses, the bit indicating that logging of memory accesses to memory addresses within the corresponding memory address range should be omitted by the processor; or
   configuring a processor register of the processor with at least one of a base memory address or a memory size, wherein at least one of the base memory address or the memory size identify at least one of (i) where to locate the bitmap, or (ii) the particular range of memory addresses.

4. The computer system of claim 1, wherein storing the one or more indicia of how to reconstruct or predict the memory values corresponding to the particular range of memory addresses comprises, for at least one memory address within the particular range of memory addresses, storing at least one of the following into a trace:
   an indication of at least a beginning address in the particular range of memory addresses;
   one or more of a file name, a file unique identifier, a file hash, or a file signature;
   an identifier of a memory-mapped device;
   an identifier of a software routine;
   at least one of an identity of a memory page stored in a memory page file or partition, or at least a portion of contents of the memory page stored in the memory page file or partition;
   one or more writes to the particular range of memory addresses; or
   at least a portion of contents of the particular range of memory addresses.

5. The computer system of claim 1, wherein, based on detecting a memory access by an executable instruction that executes as part of the process, the processor accesses the one or more data structures to determine if the processor has been instructed to omit logging of the detected memory access into the trace corresponding to the process.

6. The computer system of claim 1, wherein, based on having configured the one or more data structures that instruct the processor to omit logging memory accesses into the trace of the process, the processor omits logging of a memory access by the process to a memory address within the particular range of memory addresses.

7. A processor configured to make a logging decision based on accessing an identification of memory addresses for which the processor is instructed to omit logging, the processor comprising:
   one or more processing units;
   a cache; and
   control logic that configures the processor to at least:
      during execution of a thread corresponding to a process that executes at the one or more processing units, detect a memory access by an executable instruction that executes as part of the thread, the memory access being targeted at a particular memory address within a memory space for the process;
      based at least on detecting the memory access, determine if the processor has been instructed to omit logging of accesses to the particular memory address into a trace corresponding to the process, including checking one or more data structures that identify at least one range of memory addresses within the memory space for the process whose values are reconstructable or predictable from a data source that is separate from the trace, accesses to which the processor is instructed to omit logging during execution of the process at the one or more processing units; and in response to determining if the processor has been instructed to omit logging of accesses to the particular memory address, based at least on having determined that the processor has been instructed to omit logging of accesses to the particular memory address, omit logging the memory access when using the cache to process the memory access; or based at least on it being determined that the processor has not been instructed to omit logging of accesses to the particular memory address, log the memory access into the trace when using the cache to process the memory access.

8. The processor of claim 7, wherein checking the one or more data structures comprises at least one of:

identifying, from a page table entry (PTE) of a corresponding memory page containing the particular memory address, one or more PTE flags that indicate whether or not logging of memory accesses to memory addresses within the corresponding memory page should be omitted;

identifying, from a bitmap, a bit associated with a corresponding memory address range containing the particular memory address, the bit indicating whether or not logging of memory accesses to memory addresses within the corresponding memory address range should be omitted; or identifying, from a processor register, at least one of a base memory address or a memory size that are usable to determine whether or not logging of the memory access targeted at the particular memory address should be omitted.

9. The processor of claim 8, wherein, wherein the corresponding memory page overlaps with the at least one range of memory addresses, and wherein checking the one or more data structures comprises identifying the one or more PTE flags, the one or more PTE flags indicating that logging of memory accesses to the memory addresses within the corresponding memory page should be omitted;

wherein the corresponding memory address range overlaps with the at least one range of memory addresses, and wherein checking the one or more data structures comprises identifying the bit associated with the corresponding memory address range, the bit indicating that logging of memory accesses to the memory addresses within the corresponding memory page should be omitted; or checking the one or more data structures comprises identifying at least one of the base memory address or the memory size, and wherein at least one of the base memory address or the memory size identify at least one of (i) where to locate the bitmap, or (ii) the at least one range of memory addresses.

10. The processor of claim 7, wherein determining if the processor has been instructed to omit logging of accesses to the particular memory address is further based on determining that logging is enabled for the thread.

11. The processor of claim 7, wherein omitting logging of the memory access when using the cache to process the memory access comprises at least one of:

setting a tracking bit for a cache line in the cache that overlaps with the particular memory address; or refraining from setting the tracking bit for the cache line in the cache that overlaps with the particular memory address.

12. The processor of claim 7, wherein logging the memory access into the trace when using the cache to process the memory access comprises at least one of:

setting a tracking bit for a cache line in the cache that overlaps with the particular memory address; or determining that the tracking bit for the cache line in the cache that overlaps with the particular memory address has already been set.

13. The processor of claim 7, wherein the processor determines that the processor has been instructed to omit logging of accesses to the particular memory address, and wherein the processor omits logging the memory access when using the cache to process the memory access.

14. The processor of claim 7, wherein the processor determines that the processor has not been instructed to omit logging of accesses to the particular memory address, and wherein the processor logs the memory access into the trace when using the cache to process the memory access.

15. The processor of claim 7, wherein the processor determines if the processor has been instructed to omit logging of accesses in connection with at least one of:

processing a cache miss for the particular memory address; or locating an existing cache line overlapping with the particular memory address.

16. A method, implemented at a computer system that includes a processor, comprising:

based at least on configuring a memory space for a process, determining that memory values corresponding to a particular range of memory addresses within the memory space for the process can be reconstructed or predicted from a data source that is separate from traced memory accesses by instructions that execute as part of the process; and based at least on the determination, configure one or more data structures that instruct the processor to omit logging memory accesses into a trace of the process when the processor accesses a memory address within the particular range of memory addresses during execution of the process at the processor; and store one or more indicia of how to reconstruct or predict the memory values corresponding to the particular range of memory addresses, the one or more indicia indicating at least an identity of the data source that is separate from the traced memory accesses.

17. The method of claim 16, wherein determining that the memory values corresponding to the particular range of memory addresses within the memory space for the process can be reconstructed or predicted separately from logging memory accesses by instructions that execute as part of the process comprises at least one of:

determining that the particular range of memory addresses maps to data of a file;

determining that the particular range of memory addresses corresponds to a memory-mapped device having a known behavioral pattern;

determining that the particular range of memory addresses stores a result of a software routine having a known behavioral pattern;

determining that the particular range of memory addresses corresponds to at least one of a binary import table or a binary export table;

determining that the particular range of memory addresses corresponds to a memory page stored in a memory page file or partition;

determining that the particular range of memory addresses corresponds to data that is separately log-able; or determining that the particular range of memory addresses corresponds to data that can be reconstructed through replay of traced executable instructions.

18. The method of claim 16, wherein configuring the one or more data structures that instruct the processor to omit logging when the processor accesses the memory address within the particular range of memory addresses comprises at least one of:

configuring a page table entry (PTE) of a corresponding memory page overlapping with the particular range of memory addresses, the PTE including one or more PTE flags that indicate that logging of memory accesses to memory addresses within the corresponding memory page should be omitted by the processor;

creating a bitmap, a bit in the bitmap associated with a corresponding memory address range overlapping with the particular range of memory addresses, the bit indicating that logging of memory accesses to memory addresses within the corresponding memory address range should be omitted by the processor; or configuring a processor register of the processor with at least one of a base memory address or a memory size, wherein at least one of the base memory address or the memory size identify at least one of (i) where to locate the bitmap, or (ii) the particular range of memory addresses.

19. The method of claim 16, wherein storing the one or more indicia of how to reconstruct or predict the memory values corresponding to the particular range of memory addresses comprises, for at least one memory address within the particular range of memory addresses, storing at least one of the following into a trace:

an indication of at least a beginning address in the particular range of memory addresses;

one or more of a file name, a file unique identifier, a file hash, or a file signature;

an identifier of a memory-mapped device;

an identifier of a software routine;

at least one of an identity of a memory page stored in a memory page file or partition, or at least a portion of contents of the memory page stored in the memory page file or partition;

one or more writes to the particular range of memory addresses; or at least a portion of contents of the particular range of memory addresses.

20. The method of claim 16, wherein, based on detecting a memory access by an executable instruction that executes as part of the process, the processor accesses the one or more data structures to determine if the processor has been instructed to omit logging of the detected memory access into the trace corresponding to the process.

* * * * *